United States Patent
Marascu et al.

(10) Patent No.: US 11,397,954 B2
(45) Date of Patent: *Jul. 26, 2022

(54) PROVIDING ANALYTICS ON COMPLIANCE PROFILES OF TYPE ORGANIZATION AND COMPLIANCE NAMED ENTITIES OF TYPE ORGANIZATION

(71) Applicant: INTERNATIONAL BUSINESS MACHINES CORPORATION, Armonk, NY (US)

(72) Inventors: Alice-Maria Marascu, Dublin (IE); Rahul Nair, Dublin (IE); Marc H. Coq, Hopewell Junction, NY (US); Sandra C. Thompson, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/953,747

(22) Filed: Apr. 16, 2018

(65) Prior Publication Data
US 2019/0318364 A1    Oct. 17, 2019

(51) Int. Cl.
*G06Q 30/00*    (2012.01)
*G06F 40/295*    (2020.01)

(52) U.S. Cl.
CPC ......... *G06Q 30/018* (2013.01); *G06F 40/295* (2020.01)

(58) Field of Classification Search
CPC ................ G06Q 30/018; G06F 40/295
See application file for complete search history.

(56) References Cited

U.S. PATENT DOCUMENTS

| 7,603,358 B1 | 10/2009 | Anderson et al. |
| 7,937,319 B2 | 5/2011 | Kennis et al. |
| 8,694,347 B2 | 4/2014 | Kennis et al. |
| 9,058,606 B1* | 6/2015 | Tulek ............ G06Q 30/018 |
| 9,123,024 B2 | 9/2015 | Levine et al. |

(Continued)

FOREIGN PATENT DOCUMENTS

WO    2016070271 A1    5/2016

OTHER PUBLICATIONS

M. El Kharbili, Q. Ma, P. Keisen and E. Pulvermueller, "CoReL: Policy-Based and Model-Driven Regulatory Compliance Management," 2011 IEEE 15th International Enterprise Distributed Object Computing Conference, 2011, pp. 247-256, doi: 10.1109/EDOC.2011.23. (Year: 2011).*

(Continued)

*Primary Examiner* — Carrie S Gilkey
(74) *Attorney, Agent, or Firm* — Griffiths & Seaton PLLC

(57) ABSTRACT

Embodiments providing analytics on a compliance profile of type organization and a compliance named entity of type organization by a processor. Text data may be extracted from one or more data sources representing one or more objects describing a compliance named entity of type organization expected to perform an obligation. A compliance profile of type organization may be determined for the compliance named entity of type organization according to the extracted text data. One or more compliance named entities of type organization may be matched to the one or more compliance profiles of type organization.

20 Claims, 13 Drawing Sheets

(56) References Cited

U.S. PATENT DOCUMENTS

| | | | |
|---|---|---|---|
| 9,292,623 | B2 | 3/2016 | Walker |
| 9,355,255 | B1 | 5/2016 | King et al. |
| 2004/0107124 | A1 | 6/2004 | Sharpe et al. |
| 2006/0212486 | A1* | 9/2006 | Kennis .................. G06Q 40/04 |
| 2009/0177664 | A9 | 7/2009 | Hotchkiss et al. |
| 2013/0311467 | A1* | 11/2013 | Galle .................. G06F 40/247 |
| | | | 707/737 |
| 2016/0078363 | A1 | 3/2016 | Hodel et al. |
| 2016/0188541 | A1 | 6/2016 | Chulinin |
| 2016/0350766 | A1* | 12/2016 | Clark ................. G06Q 30/0609 |
| 2016/0371618 | A1 | 12/2016 | Leidner et al. |
| 2017/0236129 | A1 | 8/2017 | Kholkar et al. |
| 2019/0318362 | A1 | 10/2019 | Marascu et al. |
| 2019/0318363 | A1 | 10/2019 | Marascu et al. |
| 2019/0318364 | A1 | 10/2019 | Marascu et al. |

OTHER PUBLICATIONS

List of IBM Patents or Patent Applications Treated as Related dated Apr. 17, 2018 (2 pages).

Kiyavitskaya et al., "Extracting Rights and Obligations from Regulations: Toward a Tool-Supported Process," Proceedings of the 22nd IEEE/ACM International Conference on Automated Software Engineering, 2007 (4 pages).

Sapkota et al., "Extracting Meaningful Entities from Regulatory Text: Towards Automating Regulatory Compliance," 2012 IEEE Fifth International Workshop on Requirements Engineering and Law (RELAW), 2012 (4 pages).

Kiyavitskaya et al., "Automating the Extraction of Rights and Obligations for Regulatory Compliance," Retrieved from Internet using: http://www.cs.cmu.edu/~./breaux/publications/nkiyavitskaya-er08.pdf, 2008 (14 pages).

Breaux et al., "Towards Regulatory Compliance: Extracting Rights and Obligations to Align Requirements with Regulations," 14th IEEE International Requirements Engineering Conference (RE'06), 2006 (10 pages).

Breaux et al., "Mining Rule Semantics to Understand Legislative Compliance," In Proceedings of the 2005 ACM Workshop on Privacy in the Electronic Society (WPE '05), ACM, 2005 (4 pages).

Kharbili et al., "Enterprise Regulatory Compliance Modeling using CoReL: An Illustrative Example," 2011 IEEE Conference on Commerce and Enterprise Computing, 2011 (6 pages).

Sadiq et al., "Managing Regulatory Compliance in Business Processes," Handbook on Business Process Management 2, International Handbooks on Information Systems, 2015 (23 pages).

Sapkota et al., "Towards Semantic Methodologies for Automatic Regulatory Compliance Support," In Proceedings of the 4th Workshop for Ph.D Students in Information and Knowledge Management (PIKM '11), ACM, 2011 (4 pages).

Ghanavati, "A compliance framework for business processes based on URN," University of Ottawa, 2007 (140 pages).

Schumm et al., "Integrating Compliance into Business Processes: Process Fragments as Reusable Compliance Controls," MKWI 2010—Proceedings of the Multikonferenz Wirtschaftsinformatik, Feb. 23-25, 2010 (13 pages).

Kharbili, "Business Process Regulatory Compliance Management Solution Frameworks: A Comparative Evaluation," Proceedings of the Eighth Asia-Pacific Conference on Conceptual Modelling (APCCM), 2012 (10 pages).

"Regulatory Compliance," PTC, http://support.ptc.com/WCMS/files/45036/en/RC-2082_v2.pdf, 2007 (4 pages).

* cited by examiner

PROVIDING ANALYTICS ON COMPLIANCE PROFILES OF TYPE ORGANIZATION AND COMPLIANCE NAMED ENTITIES OF TYPE ORGANIZATION

CROSS-REFERENCE TO RELATED APPLICATIONS

This Application is related to the following Applications having U.S. application Ser. Nos. 15/953,731 and 15/953,741, each filed on even date as the present Application.

BACKGROUND OF THE INVENTION

Field of the Invention

The present invention relates in general to computing systems, and more particularly to, various embodiments for providing analytics on a compliance profile of type organization and a compliance named entity of type organization using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, legal regulations or policies, and/or financial requirements.

SUMMARY OF THE INVENTION

Various embodiments for providing analytics on a compliance profile of type organization and a compliance named entity of type organization by a processor are provided. In one embodiment, by way of example only, a method for providing analytics on a compliance profile and a compliance named entity, again by a processor, is provided. Text data may be extracted from one or more data sources representing one or more objects describing a compliance named entity of type organization expected to perform an obligation. A compliance profile of type organization may be determined for the compliance named entity of type organization according to the extracted text data. One or more compliance named entities of type organization may be matched to the one or more compliance profiles of type organization.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
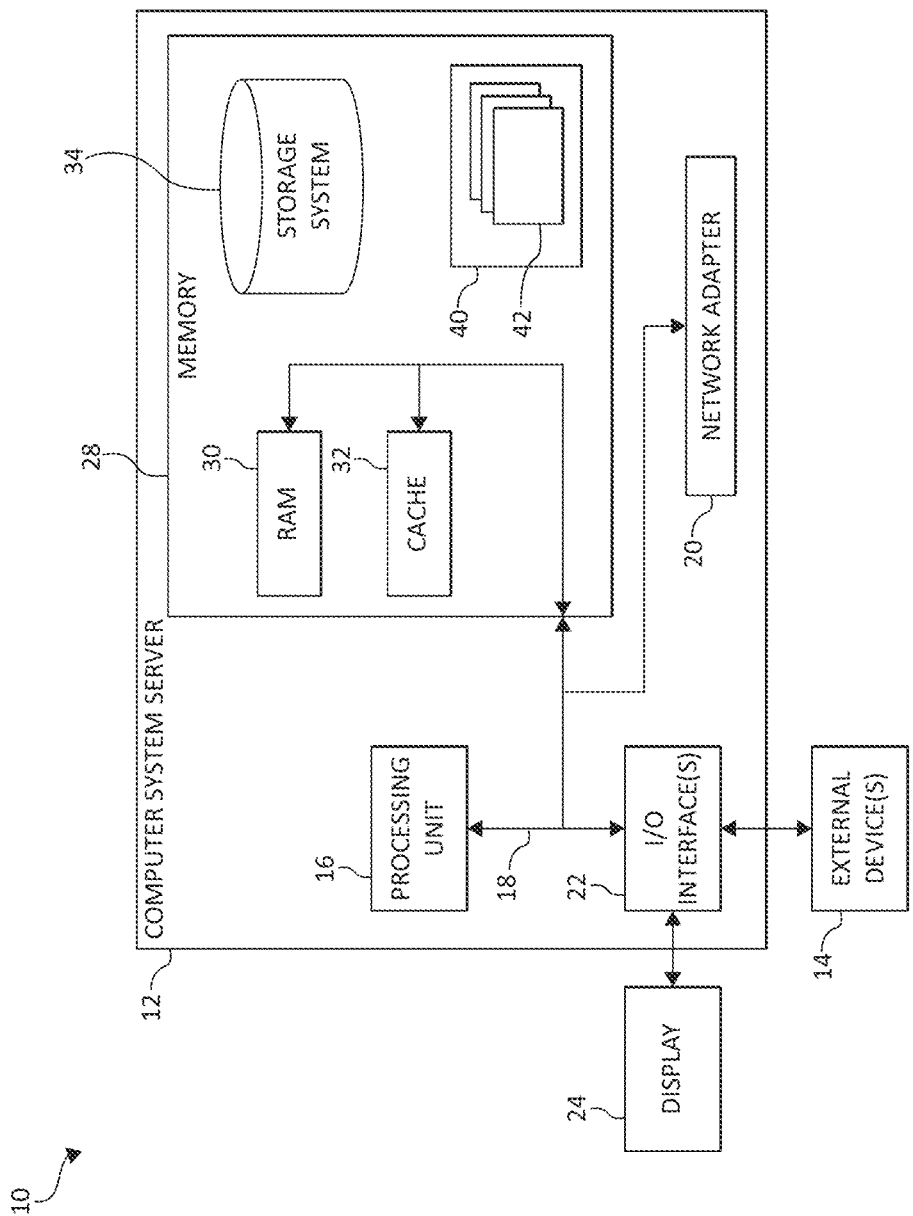
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, entities (e.g., businesses, governments, organizations, academic institutions, etc.) may be subject to certain processes, policies, guidelines, rules, laws, and/or regulations relevant to the entities. Compliance with these processes, policies, guidelines, rules, laws, and/or regulations is critical and essential to ensure integrity of the company while also avoiding violations, fines, or legal punishment. For example, regulatory compliance management is a supreme matter of paramount importance to organizations as new regulations emerge on an on-going basis. These enterprises often require human interaction with various skills and expertise (e.g., a subject matter expert "SME") to support compliance across the enterprise. Thus, given the vast amount of text data and the pace at which regulation documents change, various embodiments are provided herein to automatically identify and extract compliance representative entities and the processes, policies, guidelines, rules, laws, and/or regulations that apply to each specific type of organization.

As such, there is a need to accurately and automatically extract compliance named entities. In one aspect, a named entity of type organization may be extracted using one or more natural language processing (NLP) named-entity recognition (NER) operations. A NER operation may be a subtask of information extraction that may locate and classify named entities in text into pre-defined categories such as, for example, persons, entities, organizations, and locations. A set of sentences with an obligation-like content may be determined (e.g., computed) using the extraction operation and one or more filtering operations applied to the content of semantic roles from the sentences. A set of compliance named entities of type organization may be determined (e.g., computed). A set of features describing the domains of activity, type, and location from the extended text surrounding the entity text may be extracted. A machine learning (ML) classifier may be trained using one or more of the set of features.

In one aspect, the present invention provides a solution for automatic extraction of data of a compliance named entity of type organization. One or more segments of text data may be extracted from one or more data sources representing one or more objects describing a compliance named entity (e.g., compliance named entity of type organization) expected to perform an obligation. The compliance named entity of type organization ("CETO") may be composed of a named entity or agent and one or more features. For example, the named entity identifies an organization, an entity for which one or many rigid designators stands for the referent, or an agent that implies the organization by referring to a group of organizations that are conducting a similar type of activity. The features may include domains of activity, type, keywords, location, date, concepts, categories, and the like. For example, a named entity may be "corporation X," and the features may include a domain (e.g., import business), type (e.g., technology and computing), and location (e.g., City A in Country B). An agent (e.g., a manufacturer or importer) may refer to a group of organizations that are conducting similar or selected activities.

In an additional aspect, the present invention provides for automatic extraction of a compliance profile of type organization. Text data may be extracted from one or more data sources representing one or more objects describing a compliance named entity expected to perform an obligation. A compliance profile of type organization may be determined for the compliance named entity of type organization according to the extracted text data.

Furthermore, the present invention provides analytics on the compliance profile and the compliance named entity, again by a processor. Text data may be extracted from one or more data sources representing one or more objects describing a compliance named entity expected to perform an obligation. A compliance profile may be determined for the compliance named entity according to the extracted text data. One or more compliance named entities of type organization may be matched to the one or more compliance profiles of type organization.

In one aspect, as used herein, the term regulation may be a document written in natural language containing a set of guidelines specifying constraints and preferences pertaining to the desired structure and behavior of an enterprise. A regulation may specify the domain elements it applies to. For example, regulations may be a law (e.g., a health care law, environmental protection laws, aviation laws, etc.), a standardization document, a contract, and the like. A regulation guideline specifies the expected behavior and structure on enterprise domain elements. The regulation guideline additionally defines tolerated and non-tolerated deviations from an ideal (e.g., defined or standardized) behavior and structure, and also defines one or more exceptional cases or situations. A regulation may also specify how the enterprise ought to or may react to deviations from the ideal behavior and structure. It should be noted that in the law domain, regulatory guidelines may be referred to as "norms". A compliance requirement (CR) may be a piece of text extracted from a regulation that specifies a given regulatory guideline. The CR may refer to or be related to (e.g., through exception relations) other CRs. CRs must be interpreted by regulation and business experts in order to be transformed into a form that makes them understandable to and enforceable on the enterprise. This process is called concretization (or contextualization or internalization of CRs). A CR is interpreted and expressed in a form that allows relating the CR explicitly to an enterprise model (e.g., business process model). Regulatory Compliance Management (RCM) ensures that enterprises (data, processes, organizations, etc.) are structured and behave in accordance with the regulations that apply, i.e., with the guidelines specified in the regulations or a company is violating a regulation. RCM is composed of compliance modeling, checking, analysis and enactment. Compliance Modeling may be the task of (accurate) formal representation of CRs in the context of a given enterprise. Compliance Modeling is a foremost task in RCM and is the formal representation of compliance requirements in a form that makes them machine-interpretable. In the Compliance Modeling task, the input is a structured and refined representation of compliance requirements extracted from the regulation and the extraction may require the intervention of (i) regulatory and (ii) enterprise experts (e.g. business analysts).

Also, the term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
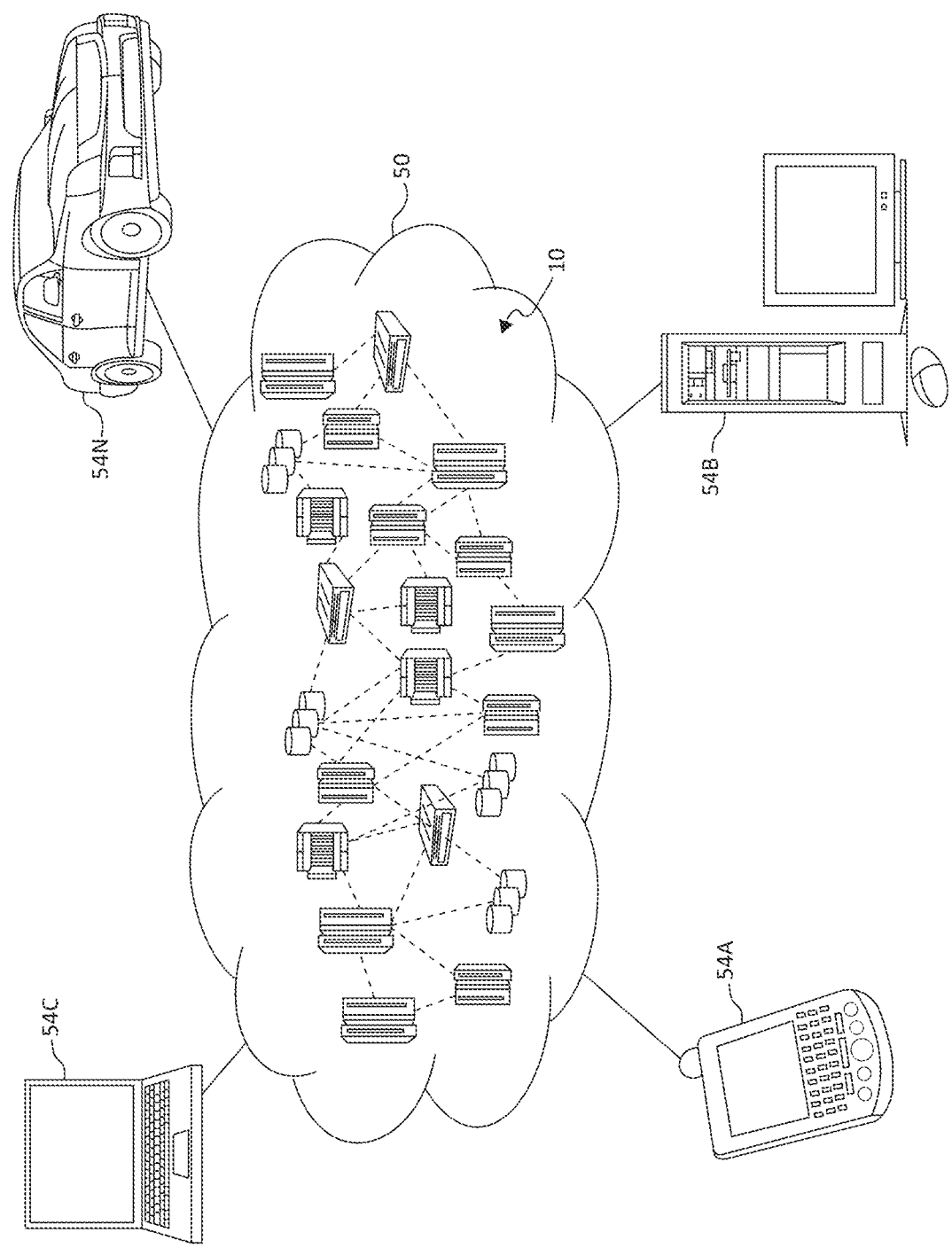
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
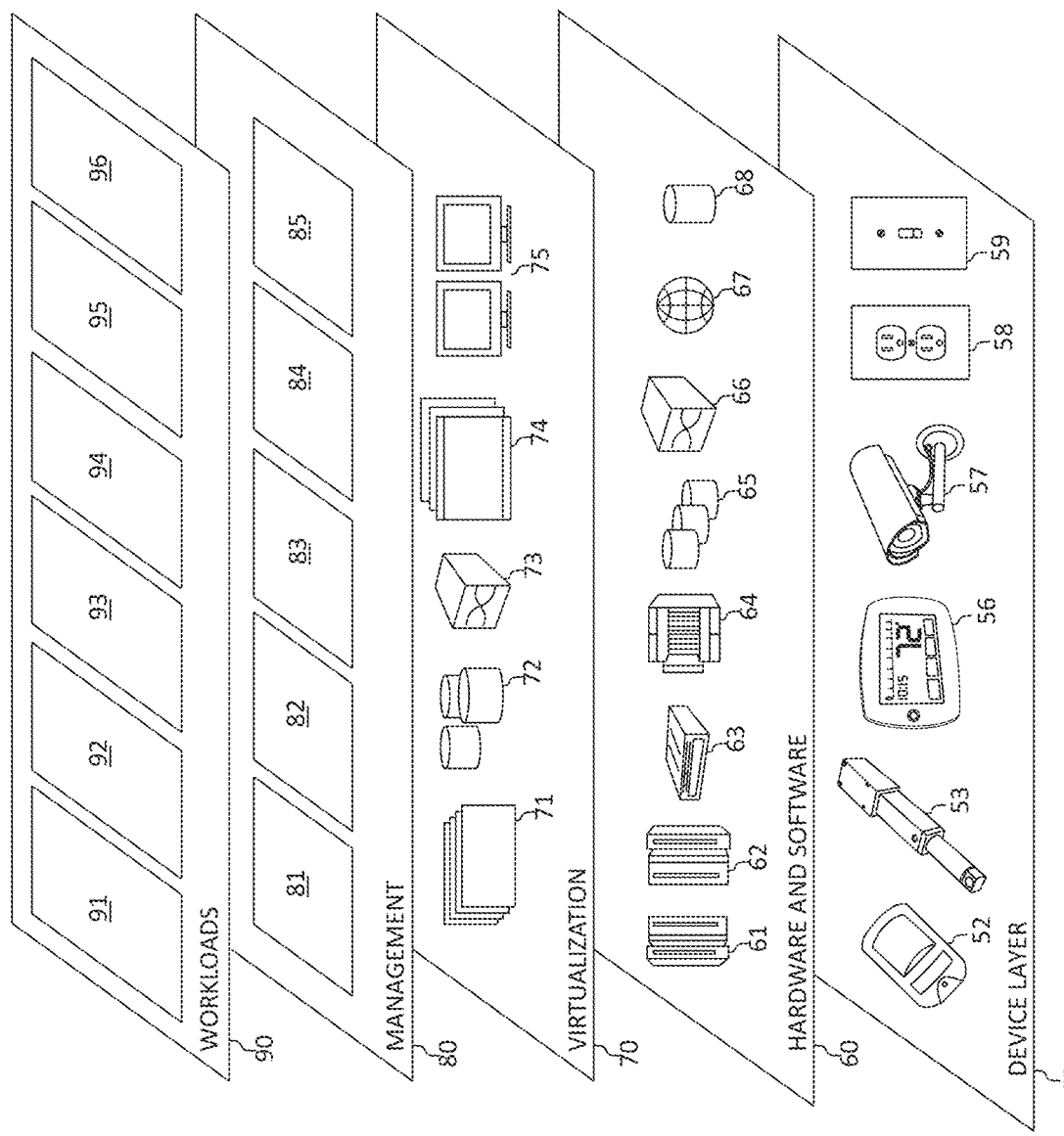
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for analytics on the compliance profile and the compliance named entity. One of ordinary skill in the art will appreciate that the workloads and functions 96 for analytics on the compliance profile and the compliance named entity may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
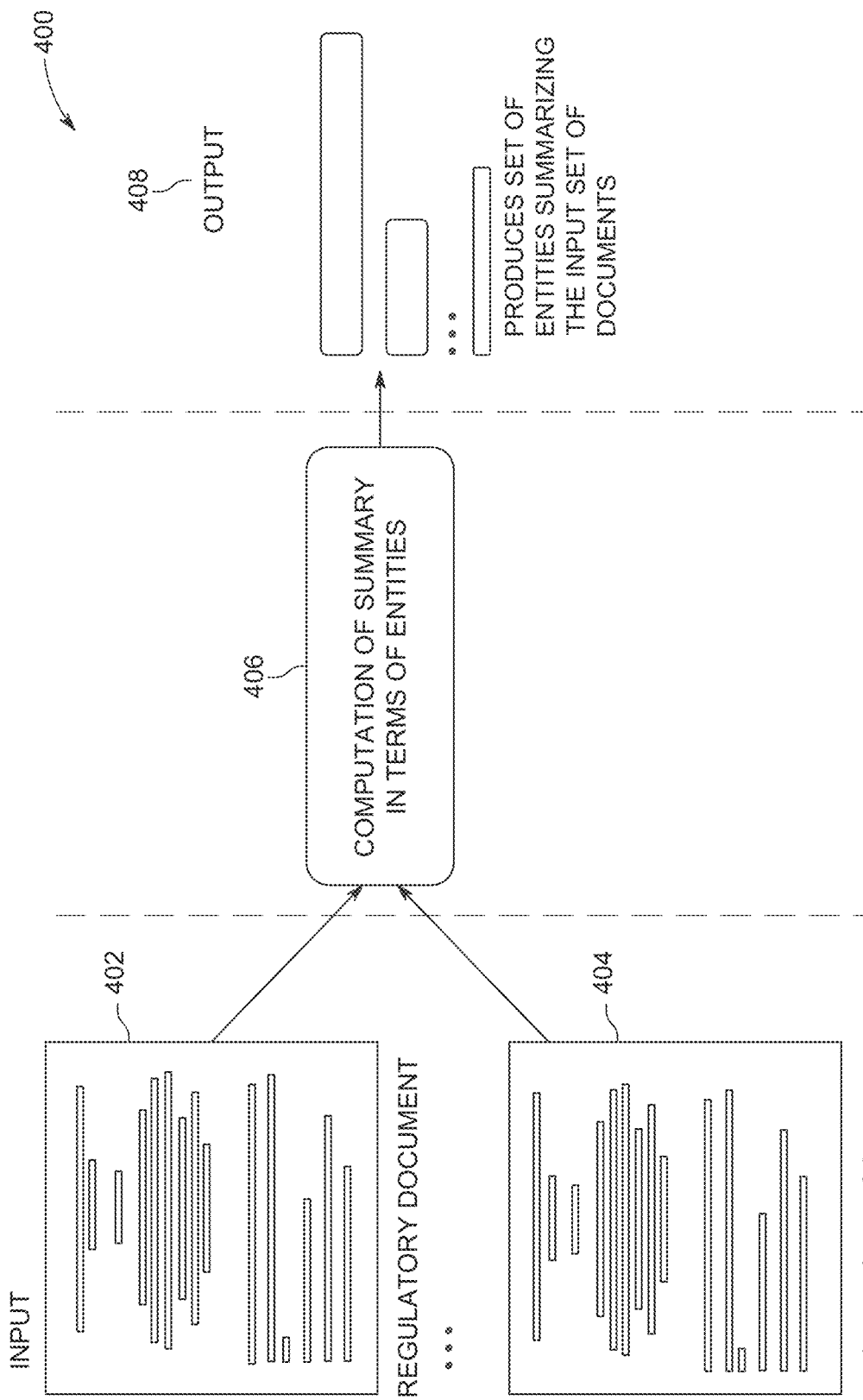
FIG. 4 is an additional diagram depicting automatic extraction of data of a compliance named entity from a data source in accordance with aspects of the present invention.

Turning now to FIG. 4, a diagram depicting a block/flow diagram for automatic extraction of data of a compliance named entity according to various mechanisms of the illustrated embodiments is shown. For example, regulation documents 402, 404 (from one or more data sources) may be analyzed and text data may be ingested via a component 406 for providing summaries in terms of entities (e.g., entity summaries). One or more segments of text data along with a set of features representing one or more objects describing a compliance named entity expected to perform an obligation may be extracted from the regulation documents 402, 404. Each set of automatically extracted features may be associated with a compliance named entity having an obligation (e.g., a legal, policy, regulatory, or procedural requirement). An output 408 may be providing a set of entities summarizing the input set of documents.

Turning now to FIGS. 5A-5H, block/flow diagram 500 depicts providing analytics on a compliance profile and a compliance named entity. More specifically, block diagrams 525, 535, 545, 555, 565, 575, and 585 of FIGS. 5B-5H are a series of operations and components for providing analytics on a compliance profile and a compliance named entity in FIG. 5A. In one aspect, one or more of the components, modules, services, applications, and/or functions described in FIGS. 1-4 may be used in FIGS. 5A-5H. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 500 relationships with each other and to show process flow. As will be seen, many of the functional blocks may also be considered "modules" or "components" of functionality. With the foregoing in mind, the module blocks 500 may also be incorporated into various hardware and software components of a system for automatic extraction of data of a compliance named entity of type organization in accordance with the present invention. Many of the functional blocks 500 may execute as background processes on various components, either in distributed computing components, or on the user device, or elsewhere.

In one aspect, at block 502, a component (e.g., a "collector") may be provided for collecting information on an entity (e.g., "organization"). Collected information for an organization may be ingested by an ingestion component for ingesting organization profiles, as in block 504. Also, segment boundary may be detected during the text data ingestion process (e.g., a sentence boundary detection) using one or more NLP processes. At block 506, a set of compliance entities of type organization (e.g., a compliance named entity) may be matched with an organizational profile such as, for example, via a component (e.g., a matching component).

At block 508, text data from one or more data sources (e.g., regulatory documents) may be ingested and/or extracted by an additional ingestion component (or the same ingestion component of block 504). Also, segment boundary may be detected during the text data ingestion process (e.g., a sentence boundary detection) using one or more NLP processes. The text data operation may include extracting one or more segments (e.g., sentences) with obligation-like content (e.g., content having direct or inferential semantics that indicate an obligation relating to a law, policy, regulation, or a combination thereof). The extraction of segments (e.g., sentences) may include, but is not limited to, extraction of information through a knowledge generation process that may include initial data collection among different sources, data normalization and aggregation, and final data extraction. Also, the extraction of regulatory, procedural, legal, policy, or other concepts and topics may include, but is not limited to, performing knowledge extraction from natural language text documents including reading input text; transforming the input text into a machine understandable knowledge representation so as to provide knowledge libraries from said documents, and using semantic based means for extracting concepts and their interrelations from said input text. Knowledge structures may be used consisting of regulatory, procedural, legal, policy, or other concepts and topics, such as obligations and violations, and the interrelations of the obligations and violations.

A set of compliance entities of type organization (e.g., a compliance named entity) may be provided such as, for example, via a component (e.g., a compliance named entity component), as in block 510. At block 512, analytics may be performed on the compliance entities of type organization (e.g., a compliance named entity) such as, for example, via a component (e.g., a compliance named entity analytics component). In one aspect, blocks 502, 504, and/or 506 may be performed in parallel and/or sequentially with blocks 508, 510, and 512.

In one aspect, the text data of one or more data sources of ingesting organization profiles and/or ingesting text data from regulatory documents may be provided by one or more content contributors. The one or more data sources may be provided as a corpus or group of data sources defined and/or identified. The one or more data sources may include, but are not limited to, data sources relating to one or more documents, organization data, regulatory documents, policy documents, legal documents, materials related to regulatory or legal compliance, emails, books, scientific papers, online journals, journals, articles, drafts, and/or other various documents or data sources capable of being published, displayed, interpreted, transcribed, or reduced to text data. The data sources may be all of the same type, for example, pages or articles in a wiki or pages of a blog. Alternatively, the data sources may be of different types, such as word documents, wikis, web pages, power points, printable document format, or any document capable of being analyzed, ingested, used by a natural language processing (NLP) system and/or artificial intelligence (AI) system to provide processed content. For example, the data sources may be processed using a lexical analysis, parsing, extraction of concepts, semantic analysis (e.g., wide-coverage semantic analysis), or a combination thereof and also analyzed by the ingestion component 502 (e.g., using an NLP operation) to data mine or transcribe relevant information from the content of the data sources.

Figure 5A:
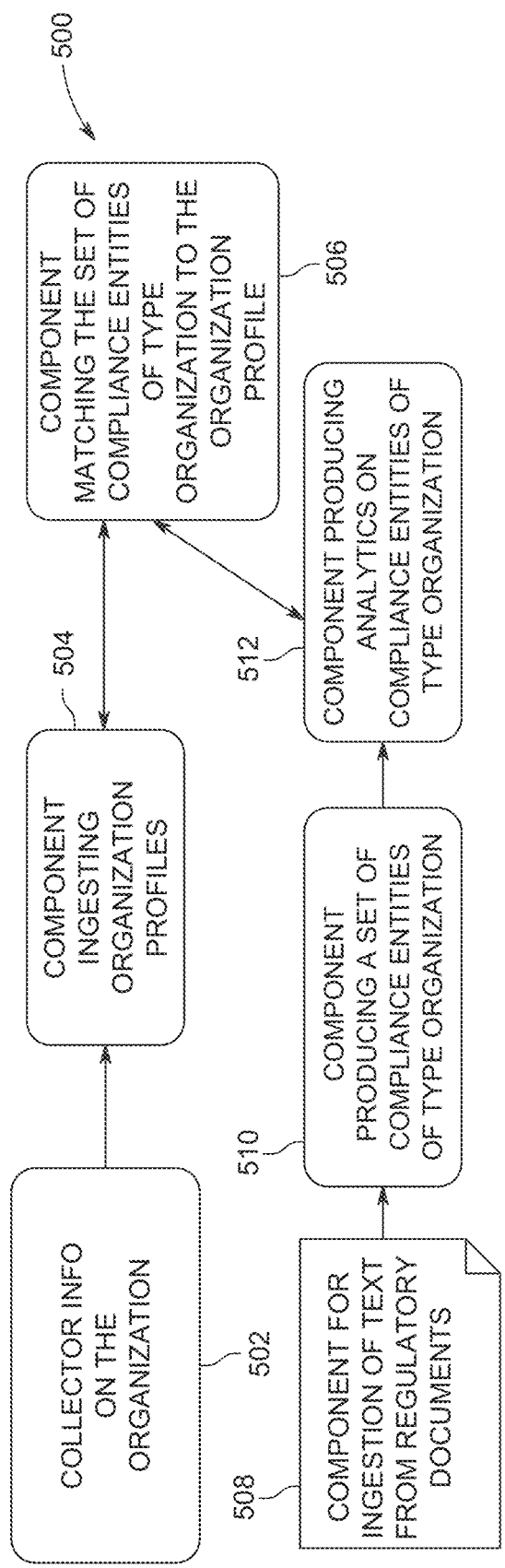
FIG. 5A is a flow diagram depicting providing analytics on a compliance profile of type organization and a compliance named entity of type organization in accordance with aspects of the present invention.
Figure 5B:
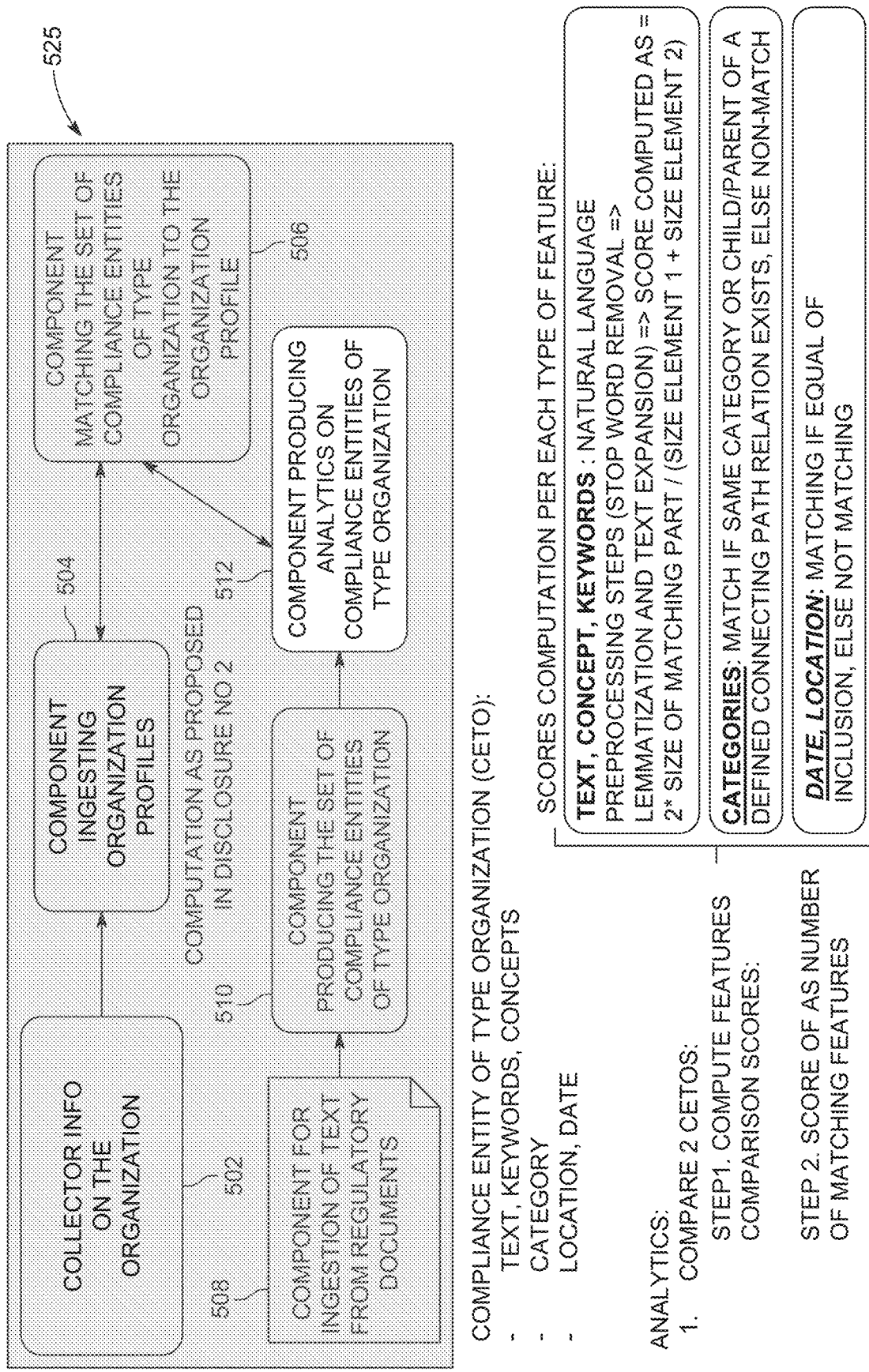
FIG. 5B is a flow diagram depicting operation on compliance named entities of type organization according to an operation for providing analytics on a compliance profile of type organization and a compliance named entity of type organization in FIG. 5A in accordance with aspects of the present invention.

Following, are additional descriptions for providing analytics on a compliance profile of type organization and a compliance named entity of type organization according to FIG. 5A. Turning now to FIG. 5B, block diagram 525 depicts operations on compliance entities of type organization. For example, a compliance entity of type organization ("CETO") may be identified or detected according to one or more features such as, for example, text data, keywords, concepts, category, location, and/or date. As part of the analytical operations, step 1 includes comparing at least two different CETOs. As part of the comparison operation, a computation score may be first determined for each feature.

That is, the five features describing the compliance entity of type organization may be organized in a collection of groups such as, for example, the features of "text," "concept," and "keywords" being a first group, "categories" being in a second group, and "date" and "location" being in a third group. For group one (e.g., text, concept, and keywords), when comparing two such entries (e.g., comparing two features), the determination/computation of each feature includes 1) cleaning the two text entries by employing NLP cleaning steps such as, for example, removal of stop words, lemmatization and text (e.g., word) expansion. A computation score of the matching text is computed such as, for example, being twice the length of the matching text (e.g., text element, text segment, or part of the text) divided by the sum of the two input texts (e.g., 2×size of matching part/(size element 1+size element 2).

For group two (e.g., categories), categories may be determined to be a match if a same category or parent/child of length of a certain size (for example 2) relation exists (e.g., a defined connecting path relationship exists), otherwise the comparison is not a match. That is, categorical data may be stored under a hierarchical format. Two categories are determined to be matching if: a) the two categories that are compared are identical, b) one category is determined to be the child or parent of the other category (e.g., parent-child relationship), or c) there is a very small connecting path (e.g., equal to or less than 2 connecting paths) between the nodes of a categorical tree and which is less than a defined threshold, such as, for example, a connecting path of a certain size (e.g., distance of 2). For group three (e.g., data and location), the features of dates and location may be matching if equal of inclusion. That is, a comparison operation may compare and match the features dates with other dates and location with other locations. The comparing and matching may be performed using temporal information (date before another date) and locations as inclusion in a geographical tree representation. Thus, the analytics include comparing 2 CETOs by 1) computing a comparison score for the features (e.g., a features comparison score), and 2) matching the comparison scores to determine matching features.

Figure 5C:
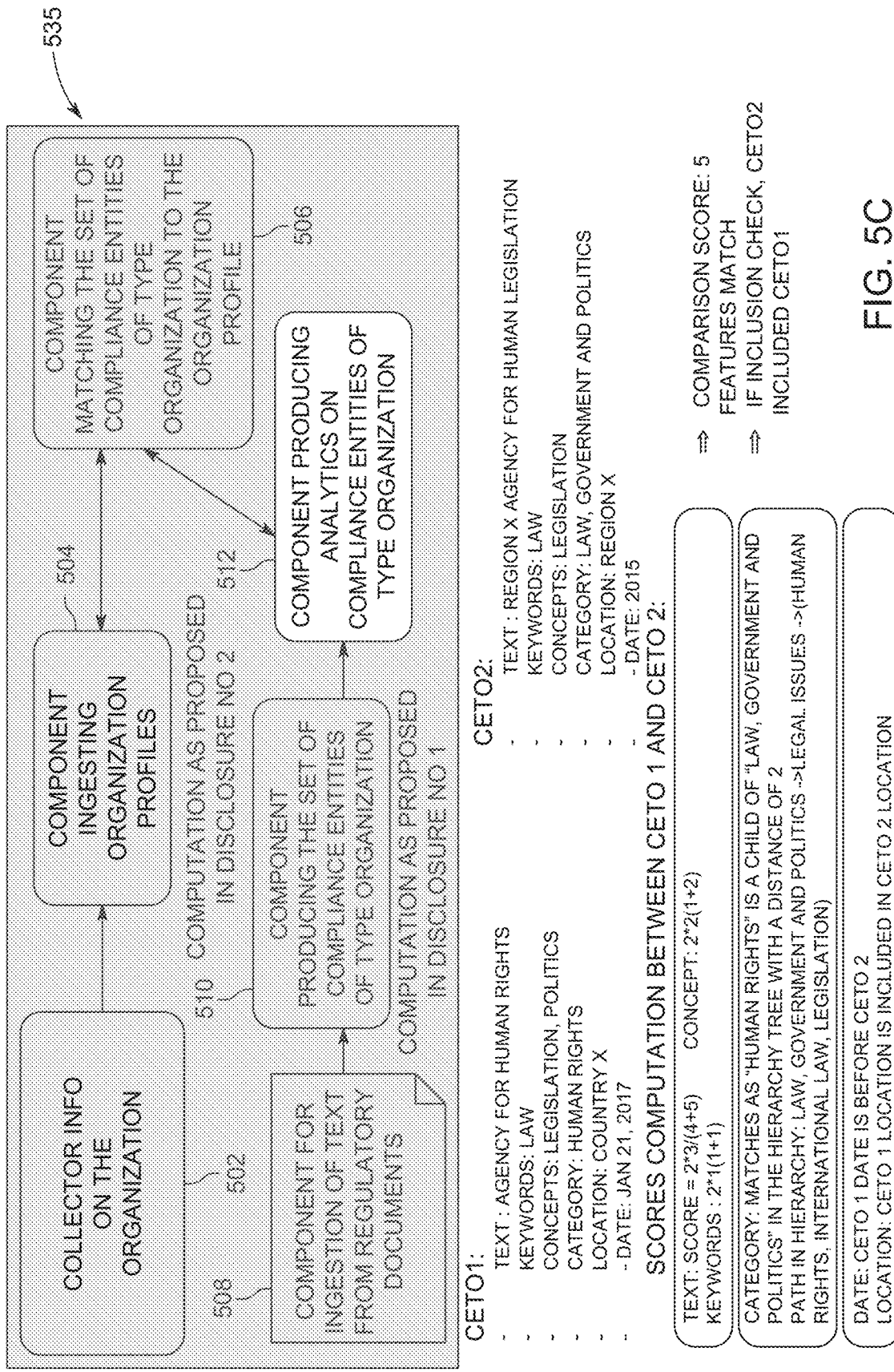
FIG. 5C is an additional flow diagram depicting operation on compliance named entities of type organization according to an operation for providing analytics on a compliance profile of type organization and a compliance named entity of type organization in FIG. 5A in accordance with aspects of the present invention.

By way of example, FIG. 5C depicts an example of comparing two CETOs (e.g., CETO 1 and CETO 2). For CETO 1, the text features indicate an agency for human rights. The keyword feature is law. The concepts features are legislation and politics. The category feature is human rights. The location is Country X. The date feature is Jan. 21, 2017.

For CETO 2, the text features indicate a Region X agency for human legislation. The keyword feature is law. The concepts feature is legislation. The category feature is law, government, and politics. The location is Region X. The date feature is 2015.

The computation scores between CETO 1 and CETO 2 are determined as follows. For text, the score is two times three divided by 4 plus 5 (e.g., 2*3/(4+5)). The concept is two times two times one plus two (2*2(1+2)). The keyword score is two times one times one plus one (e.g., 2*1(1+1)).

The categories are determined to be matches as "human rights" is a child of "law, government, and politics" in a hierarchy tree with a distance of two path in the hierarchy (e.g., law, government as a first node, to the second node of legal issues, to the third node of human rights, international law, and legislation). The date of CETO 1 is before CETO 2. The location (Government X) of CETO 1 is included in the location (e.g., Region X) of CETO 2. Thus, by comparing and matching the five various features it may be determined that CETO 2 is included in CETO 1.

Figure 5D:
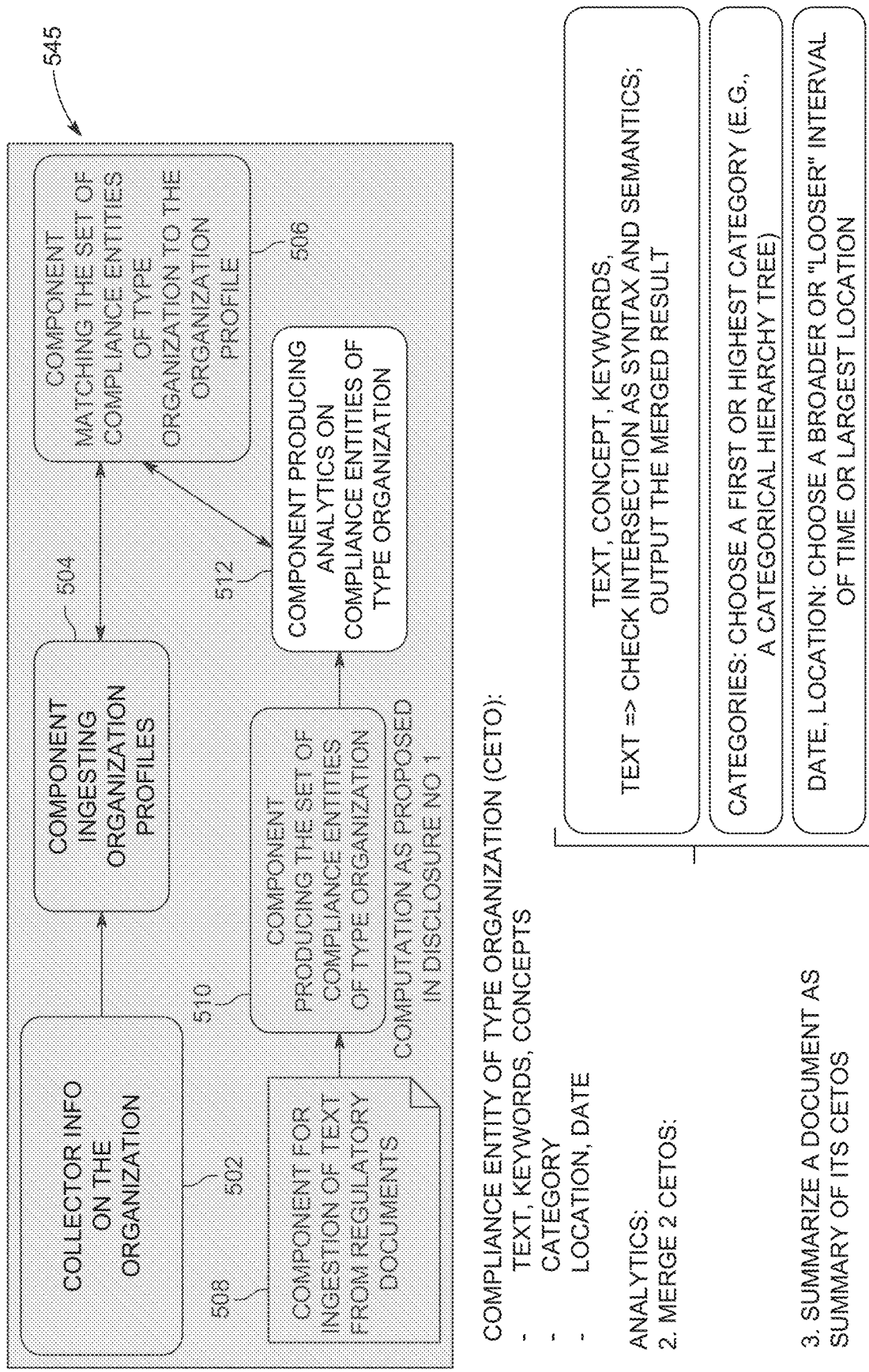
FIG. 5D is an additional flow diagram depicting operation on compliance named entities of type organization according to an operation for providing analytics on a compliance profile of type organization and a compliance named entity of type organization in FIG. 5A in accordance with aspects of the present invention.

By way of example, FIG. 5D illustrates using the various features based on determining that CETO 2 matches CETO 1. An analytics operation may include merging the two matching CETOs (e.g., merge CETO 2 and CETO 1). That is, the text, concepts, and keywords may be merged, and an intersection may be checked as syntax and semantics. The output is the merged results (e.g., the merged text, concepts, and keywords). Merging the categories may be performed by selecting a highest date (e.g., first or highest in the categorical tree). The date and location may be to select a broader date (e.g., selection of the year of 2015) or "looser" interval as compared to the more specific date (e.g., Jan. 21, 2017). The merging of locations may be performed by selecting the largest or more encompassing location (e.g., selecting Region X that includes the Government X). A document summary may be generated that summarizes the CETOs.

Figure 5E:
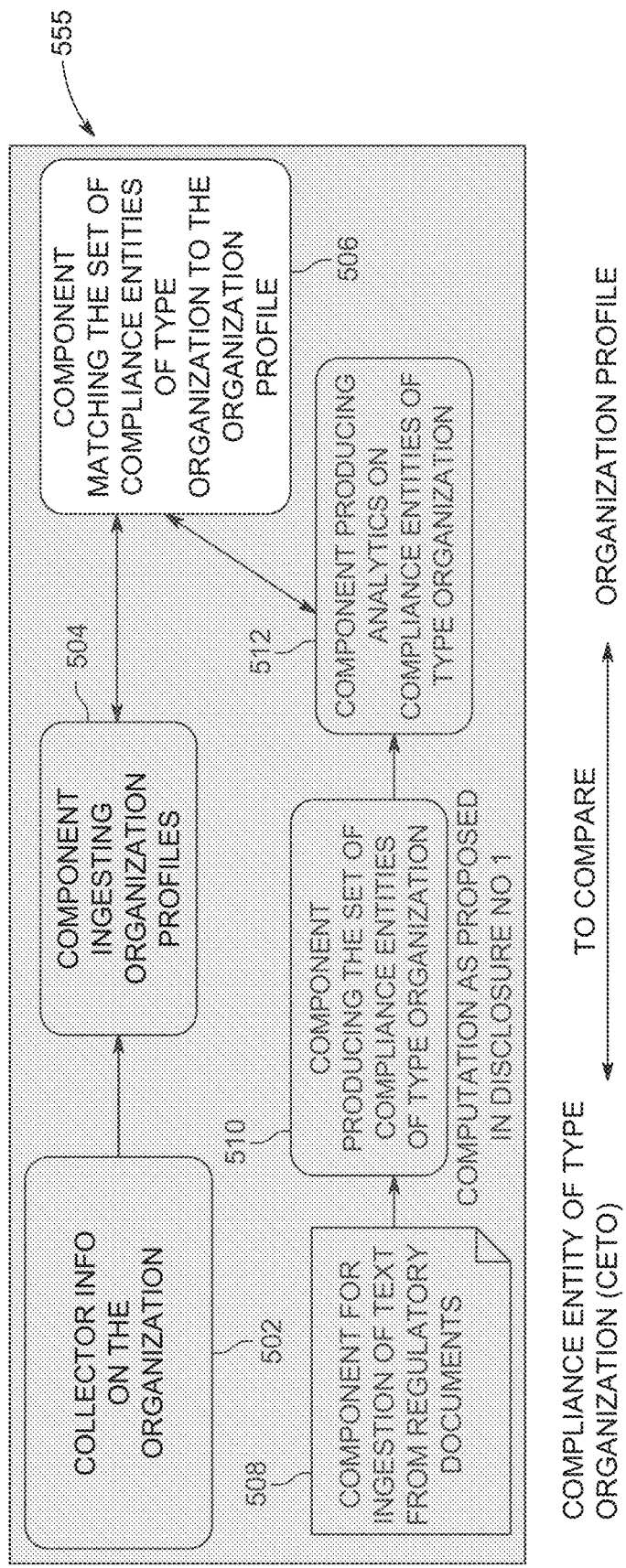
FIG. 5E is an additional flow diagram matching a set of compliance named entities to an organization profile according to an operation for providing analytics on a compliance profile of type organization and a compliance named entity of type organization in FIG. 5A in accordance with aspects of the present invention.
Figure 5F:
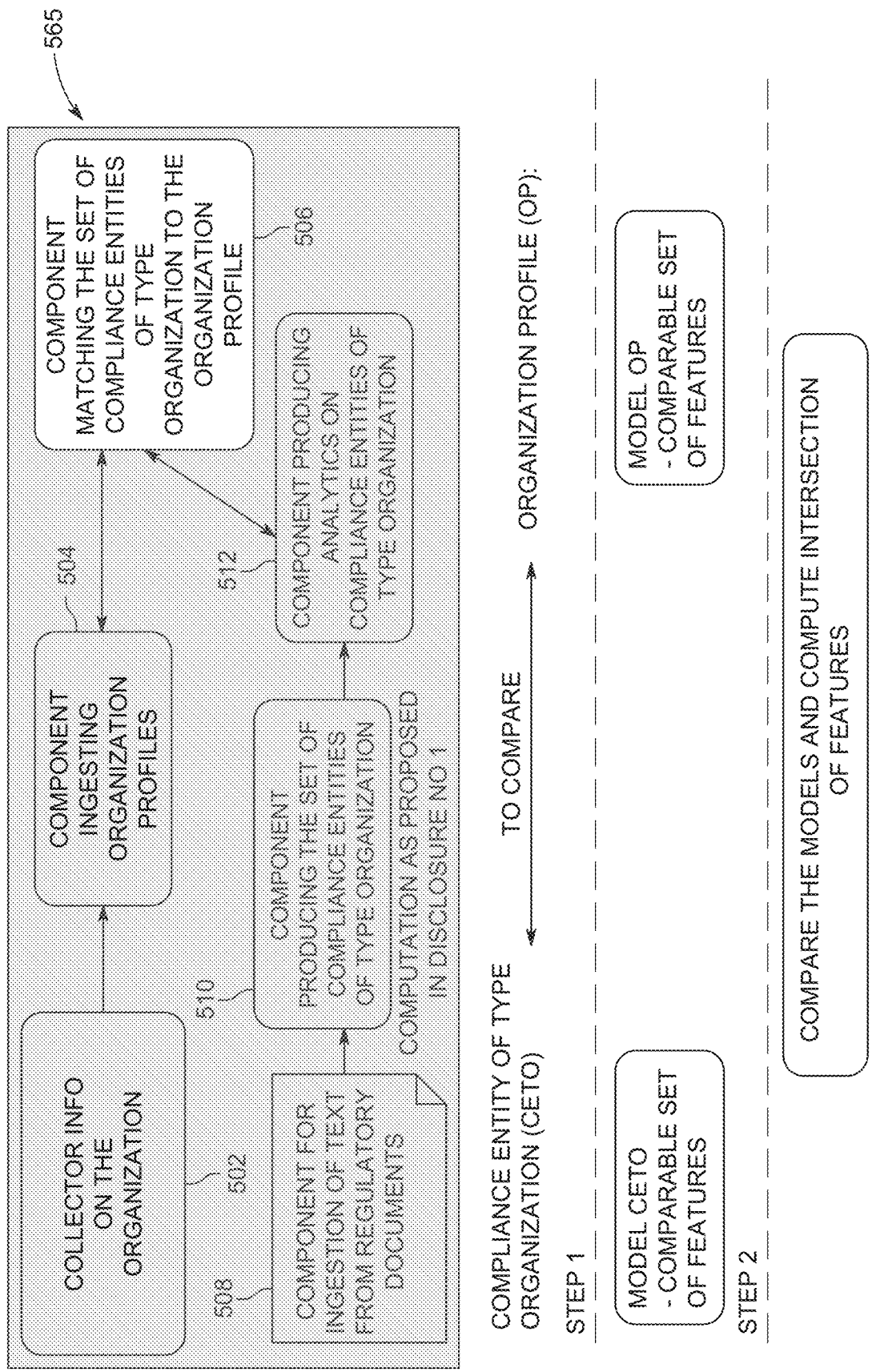
FIG. 5F is an additional flow diagram matching a set of compliance named entities to an organization profile according to an operation for providing analytics on a compliance profile of type organization and a compliance named entity of type organization in FIG. 5A in accordance with aspects of the present invention.

At this point, as illustrated in FIG. 5E, a set of compliance entities of type organization (e.g., a compliance named entity) may be matched with an organizational profile such as, for example, via a component (e.g., a matching component). The matching may include comparing a compliance entity of type organization (e.g., a compliance named entity) with an organizational profile that may include two steps. As illustrated in FIG. 5F, step 1 may include generating a CETO model by comparing a set of features and generating an organizational ("OP") model by comparing a set of features. In step 2, the models may be compared, and an intersection of features may be determined or computed.

Figure 5G:
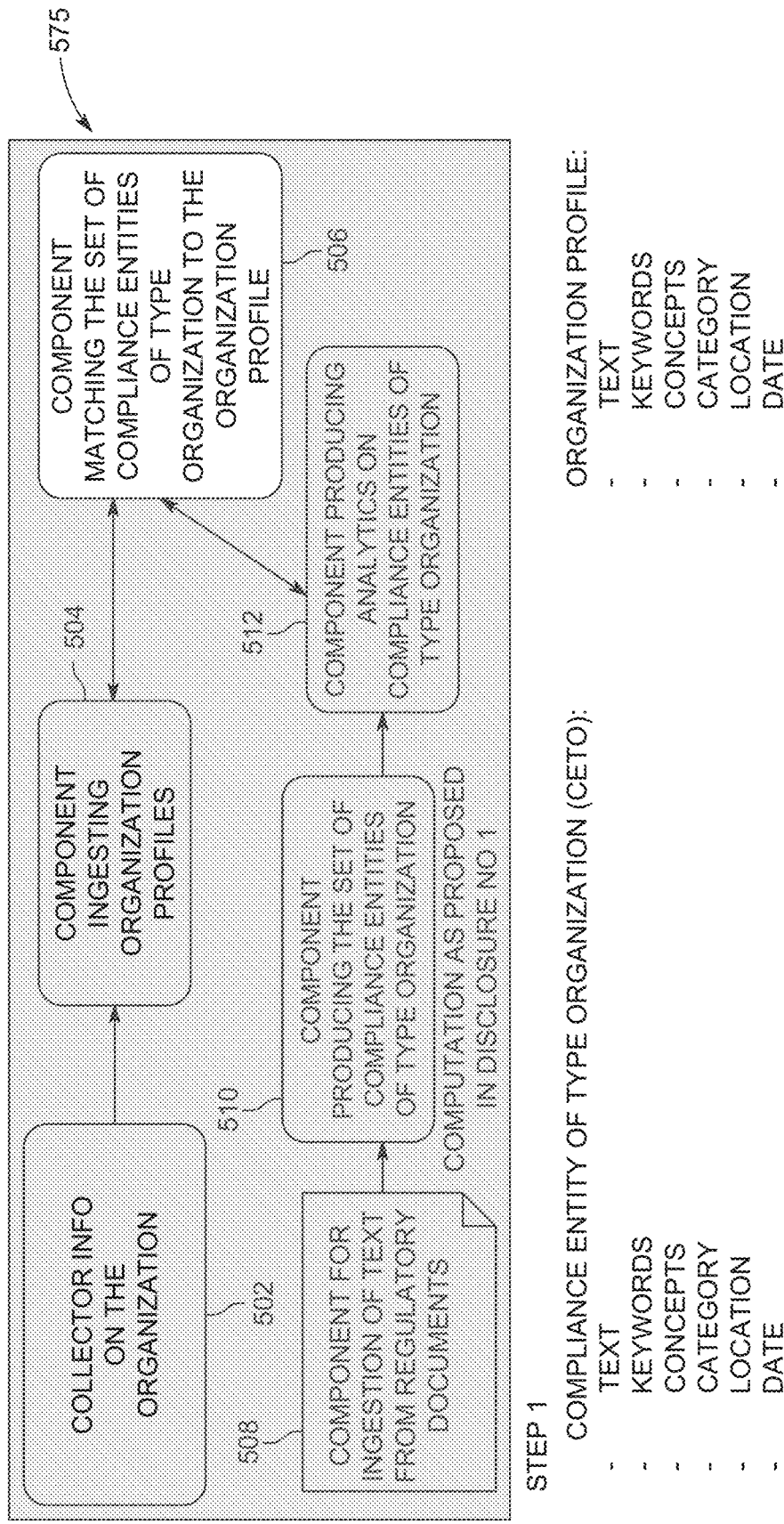
FIG. 5G is an additional flow diagram matching a set of compliance named entities to an organization profile according to an operation for providing analytics on a compliance profile of type organization and a compliance named entity of type organization in FIG. 5A in accordance with aspects of the present invention.
Figure 5H:
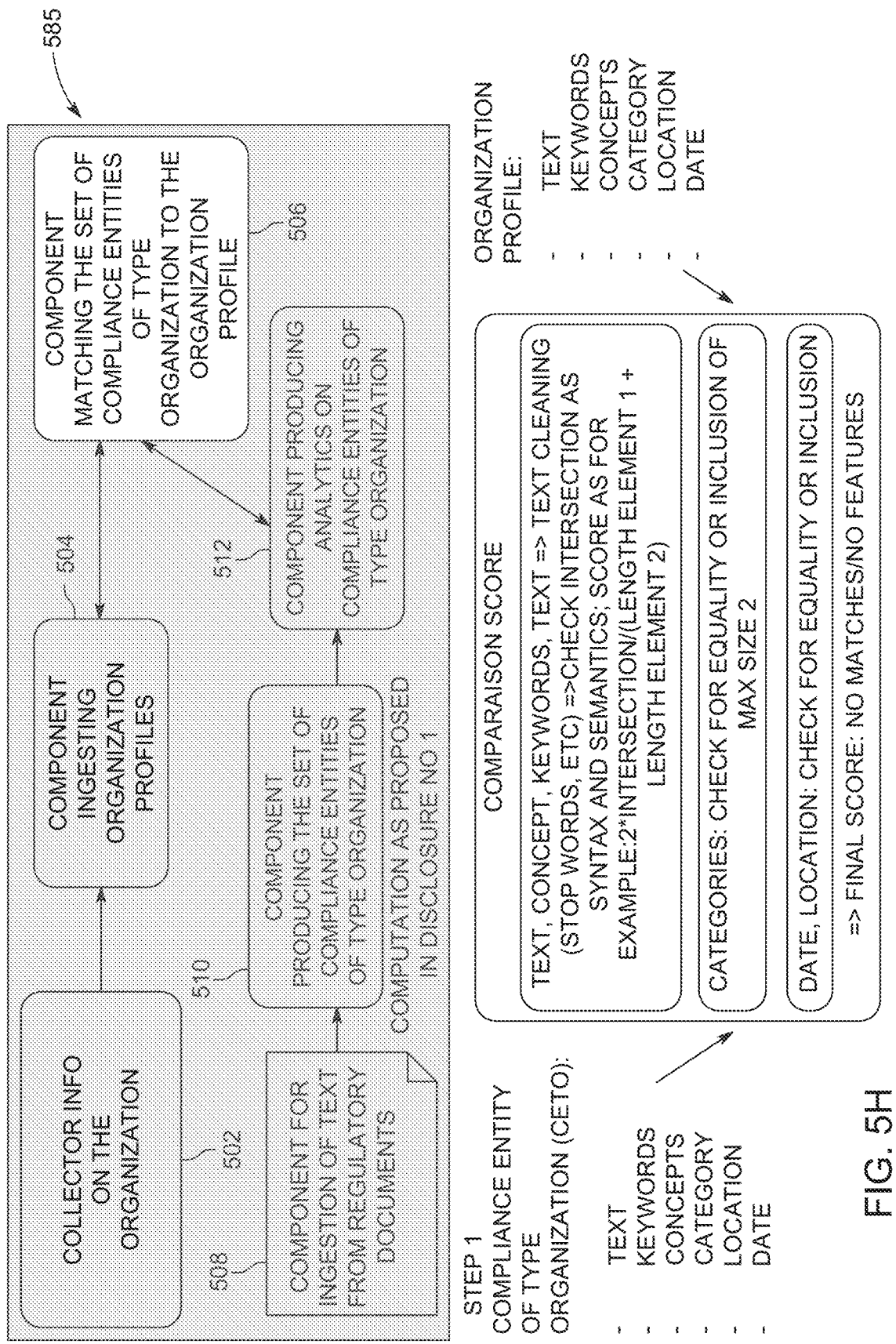
FIG. 5H is an additional flow diagram matching a set of compliance named entities to an organization profile according to an operation for providing analytics on a compliance profile of type organization and a compliance named entity of type organization in FIG. 5A in accordance with aspects of the present invention.

Furthermore, as illustrated in FIG. 5G, the features of the CETO and the organization profile may have features for text, keywords, concepts, category, location, and date, which may be used for matching the set of compliance entities of type organization to the organization profile. A comparison score may be determined using the five features describing the CETO and the organization profile. Again, the features for both the CETO and the organization profile may be organized in a collection of groups such as, for example, the features of "text," "concept," and "keywords" being a first group, "categories" being in a second group, and "date," and "location" being in a third group. For group one (e.g., text, concept, and keywords), when comparing two such entries (e.g., comparing two features), the determination/computation of each feature includes cleaning the two text entries by employing NLP cleaning steps such as, for example, stop words removal and lemmatization and word expansion. A computation score of the matching text may be determined as being twice the length of the matching text parts (e.g., the common texts) divided by the sum of the two input texts (e.g., 2×intersection (of the texts)/(length element 1+length of element 2)). For example, as indicated in the example of FIG. 5H, a final score indicates that the CETO fails to match the organization profile based on no features shown as matching.

Figure 6:
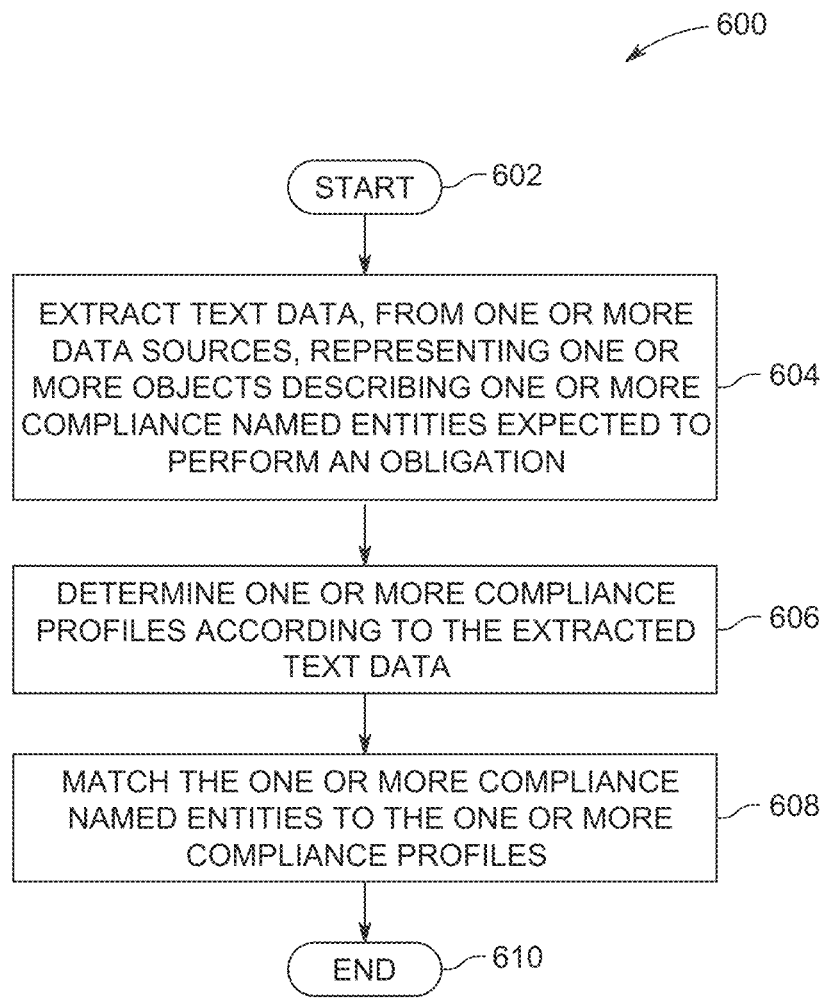
FIG. 6 is a flowchart diagram depicting an additional exemplary method for providing analytics on a compliance profile of type organization and a compliance named entity of type organization in which aspects of the present invention may be realized.

Turning now to FIG. 6, a method 600 for providing analytics on a compliance profile of type organization and a compliance named entity of type organization using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5A-5H may be implemented all and/or in part in FIG. 6.

The functionality 600 may start in block 602. Text data may be extracted from one or more data sources representing one or more objects describing a compliance named entity of type organization expected to perform an obligation, as in block 604. A compliance profile of type organization may be determined for the compliance named entity of type organization according to the extracted text data, as in block 606. One or more compliance named entities of type organization may be matched to the one or more compliance profiles, as in block 608. The functionality 600 may end, as in block 610.

In one aspect, in conjunction with and/or as part of at least one block of FIG. 6, the operations of 600 may include each of the following. The operations of 600 may include ingesting the text data from the one or more data sources upon processing the text data using a lexical analysis, parsing, extraction of concepts, semantic analysis, or a combination thereof. Boundaries of each of the one or more segments of the text data that are extracted may be detected. An NLP operation may be performed to determine one or more features associated with the one or more compliance named entities of type organization and one or more compliance profiles of type organization.

A comparison score may be determined/computed for each type of feature for the compliance named entities of type organization and for each compliance profile of type organization. The features include text, keywords, concepts, category, location, and a selected time. The one or more compliance named entities of type organization may be compared to the one or more compliance profiles of type organization (e.g., such as comparing the computation scores of the features to determine that a compliance named entity matches a compliance profile).

The operations of 600 may include comparing the one or more compliance named entities of type organization with one or more alternative compliance named entities of type organization; and merging the one or more compliance named entities of type organization with one or more alternative compliance named entities of type organization according to the comparing.

The operations of 600 may extract the compliance named entity of type organization from the text data and determine a set of the one or more segments having similar obligations of the compliance named entity. NLP may be used to determine the one or more segments for identifying the obligation. NLP may be used to determine one or more features associated with the compliance named entity of type organization, wherein the one or more features include a domain of activity, a type of organization, location data, or combination thereof. A machine learning mechanism may be initialized to learn the one or more features associated with the compliance named entity and/or to learn the one or more features associated with the compliance profile.

The operations of 600 may define the compliance named entity as a named entity identifying an organization or an agent representing a group of organizations having similar types of activities, define the compliance named entity with one or more features, wherein the one or more features include a domain of activity, a type of organization, location data, or combination thereof, and define the obligation as a required action for compliance with a law, policy, regulation, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing analytics on a compliance profile of type organization and a compliance named entity of type organization in a computing environment, comprising:
   receiving a plurality of collected information for an organization, wherein the plurality of collected information is ingested into a repository used to collect organization profiles of a plurality of organizations inclusive of the organization;
   extracting text data, from one or more data sources, representing one or more features describing one or more compliance named entities expected to perform an obligation, wherein the one or more features describing the compliance named entity are identified by performing a named-entity recognition (NER) operation on the text data as a subtask of the text data extraction;
   classifying specifically named entities into predefined categories, wherein the predefined categories represent one of the one or more features;
   associating the obligation with the compliance named entity based on the compliance named entity being in a similar one of the predefined categories, and wherein the obligation is identified by locating obligatory language, identified among non-obligatory language in both regulatory and non-regulatory documents and determined by examining both direct and inferential semantic content in the text data, directed to an action specifically required by a referent of the NER operation;
   training a machine learning classifier, using the one or more features from the extracted text data, to associate the obligation with the compliance named entity;
   determining one or more compliance profiles of type organization according to the association formed by the trained machine learning classifier used on the extracted text data, wherein determining the one or more compliance profiles includes implementing the trained machine learning classifier to automatically assign the obligation to a specific company comprising the compliance named entity; and
   matching the one or more compliance named entities of type organization to the one or more compliance profiles of type organization, wherein the matching includes pairing those of the one or more features extracted from the text data determined to be similar between the one or more compliance profiles of type organization to the one or more compliance named entities of type organization comprising a determined one of the plurality of organizations.

2. The method of claim 1, further including ingesting the text data from the one or more data sources upon processing the text data using a lexical analysis, parsing, extraction of concepts, semantic analysis, or a combination thereof.

3. The method of claim 1, further including using natural language processing (NLP) to determine the one or more features associated with the one or more compliance named entities of type organization and one or more compliance profiles of type organization.

4. The method of claim 1, further including determining a comparison score for each type of feature associated with the one or more compliance named entities of type organization and associated with the one or more compliance profiles of type organization, wherein the features further include text, keywords, concepts, location, and a selected time.

5. The method of claim 1, further including comparing the one or more compliance named entities of type organization to the one or more compliance profiles of type organization.

6. The method of claim 1, further including:
   comparing the one or more compliance named entities of type organization with one or more alternative compliance named entities of type organization; and
   merging the one or more compliance named entities of type organization with one or more alternative compliance named entities of type organization according to the comparing.

7. The method of claim 1, further including:
   initializing a machine learning mechanism to learn the one or more features associated with the compliance profile of type organization;
   defining a compliance named entity as a named entity identifying an organization or an agent representing a group of organizations having similar types of activities; and
   defining the obligation as the required action for compliance with a law, policy, regulation, or a combination thereof.

8. A system for providing analytics on a compliance profile of type organization and a compliance named entity of type organization in a computing environment, comprising:
   one or more computers with executable instructions that when executed cause the system to:
      receive a plurality of collected information for an organization, wherein the plurality of collected information is ingested into a repository used to collect organization profiles of a plurality of organizations inclusive of the organization;
      extract text data, from one or more data sources, representing one or more features describing one or more compliance named entities expected to perform an obligation, wherein the one or more features describing the compliance named entity are identified by performing a named-entity recognition (NER) operation on the text data as a subtask of the text data extraction;
      classify specifically named entities into predefined categories, wherein the predefined categories represent one of the one or more features;
      associate the obligation with the compliance named entity based on the compliance named entity being in a similar one of the predefined categories, and wherein the obligation is identified by locating obligatory language, identified among non-obligatory language in both regulatory and non-regulatory documents and determined by examining both direct and inferential semantic content in the text data, directed to an action specifically required by a referent of the NER operation;
      train a machine learning classifier, using the one or more features from the extracted text data, to associate the obligation with the compliance named entity;
      determine one or more compliance profiles of type organization according to the association formed by the trained machine learning classifier used on the extracted text data, wherein determining the one or more compliance profiles includes implementing the trained machine learning classifier to automatically assign the obligation to a specific company comprising the compliance named entity; and match the one or more compliance named entities of type organization to the one or more compliance profiles of type organization, wherein the matching includes pairing those of the one or more features extracted from the text data determined to be similar between the one or more compliance profiles of type organization to the one or more compliance named entities of type organization comprising a determined one of the plurality of organizations.

9. The system of claim 8, wherein the executable instructions ingest the text data from the one or more data sources upon processing the text data using a lexical analysis, parsing, extraction of concepts, semantic analysis, or a combination thereof.

10. The system of claim 8, wherein the executable instructions use natural language processing (NLP) to determine the one or more features associated with the one or more compliance named entities of type organization and one or more compliance profiles of type organization.

11. The system of claim 8, wherein the executable instructions determine a comparison score for each type of feature associated with the one or more compliance named entities of type organization and associated with the one or more compliance profiles of type organization, wherein the features further include text, keywords, concepts, location, and a selected time.

12. The system of claim 8, wherein the executable instructions compare the one or more compliance named entities of type organization to the one or more compliance profiles of type organization.

13. The system of claim 8, wherein the executable instructions:
compare the one or more compliance named entities of type organization with one or more alternative compliance named entities of type organization; and
merge the one or more compliance named entities of type organization with one or more alternative compliance named entities of type organization according to the comparing.

14. The system of claim 8, wherein the executable instructions:
initialize a machine learning mechanism to learn the one or more features associated with the compliance profile of type organization;
define a compliance named entity as a named entity identifying an organization or an agent representing a group of organizations having similar types of activities; and
define the obligation as the required action for compliance with a law, policy, regulation, or a combination thereof.

15. A computer program product for, by a processor, providing analytics on a compliance profile of type organization and a compliance named entity of type organization, the computer program product comprising a non-transitory computer-readable storage medium having computer-readable program code portions stored therein, the computer-readable program code portions comprising:
an executable portion that receives a plurality of collected information for an organization, wherein the plurality of collected information is ingested into a repository used to collect organization profiles of a plurality of organizations inclusive of the organization;
an executable portion that extracts text data, from one or more data sources, representing one or more features describing one or more compliance named entities expected to perform an obligation, wherein the one or more features describing the compliance named entity are identified by performing a named-entity recognition (NER) operation on the text data as a subtask of the text data extraction;
an executable portion that classifies specifically named entities into predefined categories, wherein the predefined categories represent one of the one or more features;
an executable portion that associates the obligation with the compliance named entity based on the compliance named entity being in a similar one of the predefined categories, and wherein the obligation is identified by locating obligatory language, identified among non-obligatory language in both regulatory and non-regulatory documents and determined by examining both direct and inferential semantic content in the text data, directed to an action specifically required by a referent of the NER operation;
an executable portion that trains a machine learning classifier, using the one or more features from the extracted text data, to associate the obligation with the compliance named entity;
an executable portion that determines one or more compliance profiles according to the association formed by the trained machine learning classifier used on the extracted text data, wherein determining the one or more compliance profiles includes implementing the trained machine learning classifier to automatically assign the obligation to a specific company comprising the compliance named entity; and
matches the one or more compliance named entities of type organization to the one or more compliance profiles of type organization, wherein the matching includes pairing those of the one or more features extracted from the text data determined to be similar between the one or more compliance profiles of type organization to the one or more compliance named entities of type organization comprising a determined one of the plurality of organizations.

16. The computer program product of claim 15, further including an executable portion that ingests the text data from the one or more data sources upon processing the text data using a lexical analysis, parsing, extraction of concepts, semantic analysis, or a combination thereof.

17. The computer program product of claim 15, further including an executable portion that uses natural language processing (NLP) to determine the one or more features associated with the one or more compliance named entities of type organization and one or more compliance profiles of type organization.

18. The computer program product of claim 15, further including an executable portion that:
determines a comparison score for each type of feature associated with the one or more compliance named entities of type organization and associated with the one or more compliance profiles of type organization, wherein the features further include text, keywords, concepts, location, and a selected time; or
compares the one or more compliance named entities of type organization to the one or more compliance profiles of type organization.

19. The computer program product of claim 15, further including an executable portion that:
compares the one or more compliance named entities of type organization with one or more alternative compliance named entities of type organization; and merges the one or more compliance named entities of type organization with one or more alternative compliance named entities of type organization according to the comparing.

20. The computer program product of claim 15, further including an executable portion that:
  initializes a machine learning mechanism to learn the one or more features associated with the compliance profile of type organization;
  defines a compliance named entity as a named entity identifying an organization or an agent representing a group of organizations having similar types of activities; and
  defines the obligation as the required action for compliance with a law, policy, regulation, or a combination thereof.

* * * * *